US012659848B2

(12) United States Patent
Gao et al.

(10) Patent No.: US 12,659,848 B2
(45) Date of Patent: Jun. 16, 2026

(54) CELL SELECTION METHOD, ELECTRONIC DEVICE, AND STORAGE MEDIUM

(71) Applicant: ZTE Corporation, Shenzhen (CN)

(72) Inventors: Minggang Gao, Shenzhen (CN); Xuemei Ding, Shenzhen (CN); Chao Lei, Shenzhen (CN); Mingye Wei, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 305 days.

(21) Appl. No.: 18/562,422

(22) PCT Filed: Mar. 21, 2022

(86) PCT No.: PCT/CN2022/082022
§ 371 (c)(1),
(2) Date: Nov. 20, 2023

(87) PCT Pub. No.: WO2022/242293
PCT Pub. Date: Nov. 24, 2022

(65) Prior Publication Data
US 2024/0244519 A1    Jul. 18, 2024

(30) Foreign Application Priority Data
May 20, 2021    (CN) .......................... 202110553358.7

(51) Int. Cl.
*H04W 48/20*        (2009.01)
*H04L 5/00*         (2006.01)
(Continued)

(52) U.S. Cl.
CPC ........... *H04W 48/20* (2013.01); *H04L 5/0051* (2013.01); *H04W 72/0446* (2013.01); *H04W 72/0453* (2013.01); *H04W 36/00* (2013.01)

(58) Field of Classification Search
CPC ............. H04W 48/20; H04W 72/0446; H04W 72/0453; H04W 36/00; H04W 48/06; H04W 48/16; H04W 36/22; H04L 5/0051
See application file for complete search history.

(56) References Cited

U.S. PATENT DOCUMENTS

2012/0115485 A1* 5/2012 Narasimha ............ H04W 68/02
                                                                455/437
2016/0014662 A1* 1/2016 Yiu ........................ H04L 5/001
                                                                455/436

(Continued)

FOREIGN PATENT DOCUMENTS

CN        102469050 A      5/2012
CN        103906147 A      7/2014
(Continued)

OTHER PUBLICATIONS

European Search Report for Application No. 22803622.4, dated Oct. 16, 2024, 9 pages.

(Continued)

*Primary Examiner* — Jung H Park
(74) *Attorney, Agent, or Firm* — CANTOR COLBURN LLP

(57) ABSTRACT

Disclosed are a cell selection method, an electronic device, and a storage medium. The method may include: a list of resource blocks of a cell is obtained; the list of resource blocks is traversed, whether the current resource block is occupied is detected according to the energy of a reference signal in the current resource block and the energy of a time-frequency resource unit in the current resource block, and the number of occupied resource blocks in the cell is obtained; and a cell is selected according to the number of the occupied resource blocks and a signal measurement value of the cell.

12 Claims, 5 Drawing Sheets

(51) Int. Cl.
    *H04W 36/00*      (2009.01)
    *H04W 72/0446*    (2023.01)
    *H04W 72/0453*    (2023.01)

(56)             References Cited

U.S. PATENT DOCUMENTS

| | | | |
|---|---|---|---|
| 2017/0078939 A1* | 3/2017 | Takahashi | ........... H04W 36/302 |
| 2020/0295896 A1 | 9/2020 | Xiong et al. | |
| 2022/0216976 A1 | 7/2022 | Zhang et al. | |

FOREIGN PATENT DOCUMENTS

| | | | |
|---|---|---|---|
| CN | 105165109 A | 12/2015 | |
| CN | 107613531 A | 1/2018 | |
| EP | 2878153 B1 | 7/2017 | |
| EP | 2989850 B1 | 8/2017 | |
| WO | 2020214007 A1 | 10/2020 | |

OTHER PUBLICATIONS

Nokia et al. "CR on clarifications of NB-IoT RB power dynamic range for in-band or guard band operation (TS 36.104)" 3GPP TSG-RAN WG4 Meeting #86 R4-1802720, Mar. 2, 2018, 2 pages. International Search Report for corresponding application PCT/CN2022/082022 filed Mar. 21, 2022; Mail date May 30, 2022.

* cited by examiner

Reference signal

UE1 occupied

UE2 occupied

Idle

☐ Idle

▦ Reference signal

601

CELL SELECTION METHOD, ELECTRONIC DEVICE, AND STORAGE MEDIUM

CROSS-REFERENCE TO RELATED APPLICATION

The present disclosure is a national stage filing under 35 U.S.C. § 371 of international application number PCT/CN2020/082022, filed Mar. 21, 2022, which claims priority to Chinese Patent Application CN202110553358.7 filed on May 20, 2021 and entitled "Cell selection method and apparatus, electronic device, and storage medium", the contents of these applications are hereby incorporated by reference in their entirety.

TECHNICAL FIELD

Embodiments of the present disclosure relate to the field of networks, and in particular, to a cell selection method, electronic device, and storage medium.

BACKGROUND

During communication, the UE needs to select and access a cell. At present, most UEs evaluate the cell signal strength by using a reference signal, such as a CSI-RS (Channel State Information-Reference Signal) signal and a SS/PBCH (Synchronization Signal/Physical Broadcast Channel), and then select a cell according to the measured signal strength, so that the UE can access a cell with a strong signal strength, or select a cell based on the signal quality, such as a measured signal-to-noise ratio.

However, in the above way of cell selection, some cells are accessed by too many UEs, which leads to congestion of the cells, and further causes that the cells cannot provide any Internet access service for the UEs, and the UEs cannot access the Internet.

SUMMARY

The embodiments of the present disclosure provide a cell selection method, which may include: acquiring a resource block list of a cell; traversing the resource block list, and according to the energy of a reference signal in a current resource block and the energy of a time-frequency resource unit in the current resource block, detecting whether the current resource block is occupied, so as to obtain the number of occupied resource blocks in the cell; selecting a cell according to the number of occupied resource blocks and a signal measurement value of the cell.

The embodiments of the present disclosure further provide a cell selection device, which may include: an acquisition module, configured to acquire a resource block list of a cell; a traversing module, configured to traverse the resource block list, and detect, according to the energy of a reference signal in a current resource block and the energy of a time-frequency resource unit in the current resource block, whether the current resource block is occupied, so as to obtain the number of occupied resource blocks in the cell; a selection module, configured to select a cell according to the number of occupied resource blocks and a signal measurement value of the cell.

The embodiments of the present disclosure further provide an electronic device, which may include: at least one processor and a memory communicatively coupled to the at least one processor; the memory stores an instruction that can be executed by the at least one processor, where the instruction is executed by the at least one processor, so that the at least one processor can execute the foregoing cell selection method.

The embodiments of the present disclosure further provide a computer-readable storage medium, which stores a computer program, wherein the computer program implements the described cell selection method when being executed by a processor.

DETAILED DESCRIPTION OF THE EMBODIMENTS

It can be seen from the background art that the CSI-RS (Channel State Information-Reference Signal) or the SS/PBCH (Synchronization Signal/Physical Broadcast Channel) can be used in the existing art, obtaining signal strength by a reference signal such as a synchronization signal/a physical broadcast channel, and selecting a cell by means of the signal strength, or selecting a cell based on a measured signal quality, such as a signal-to-noise ratio, but whether by signal strength or signal quality. Therefore, a certain cell may be accessed by too many users, resulting in cell congestion.

In the embodiment, as an example, the used reference signal is a CSI-RS, a signal strength is obtained according to the CSI-RS, and a cell is selected according to the signal strength.

Figure 1:
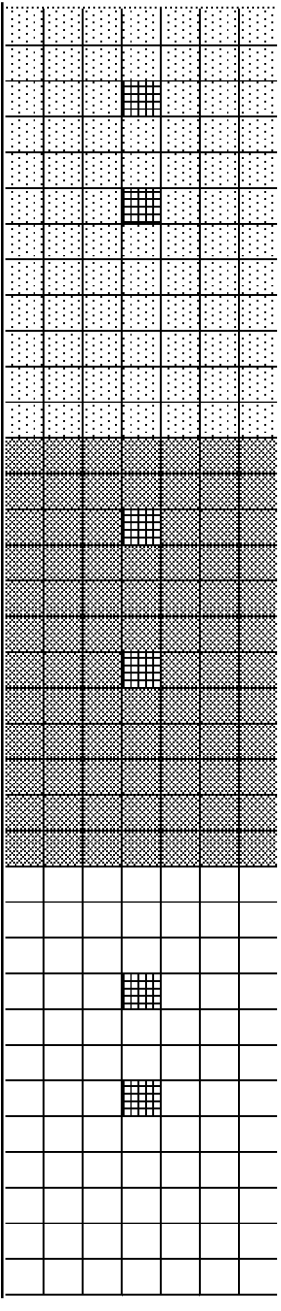
FIG. 1 is a schematic diagram of a bandwidth configuration of a cell 1 in the existing art.

Referring to FIG. 1, the bandwidth configuration of cell 1 is shown. In the cell 1, there are three resource blocks, one resource block is occupied by UE 1, and one resource block is occupied by a UE 2. That is, in the three resource blocks of the cell 1, two resource blocks are occupied.

Figure 2:
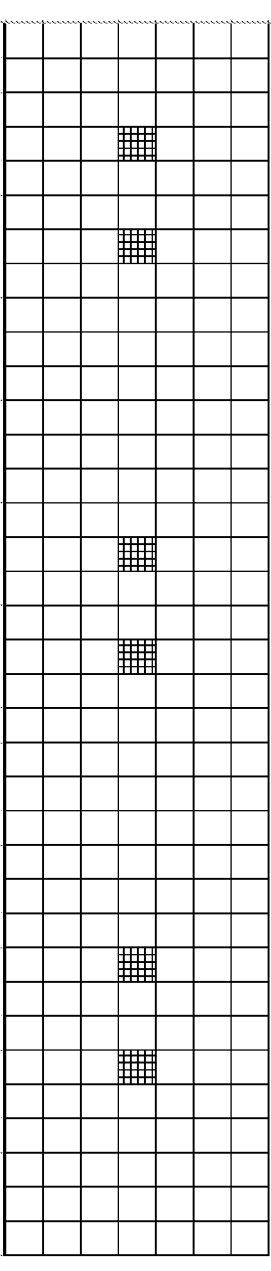
FIG. 2 is a schematic diagram of a bandwidth configuration of a cell 2 in the existing art.
Figure 3:
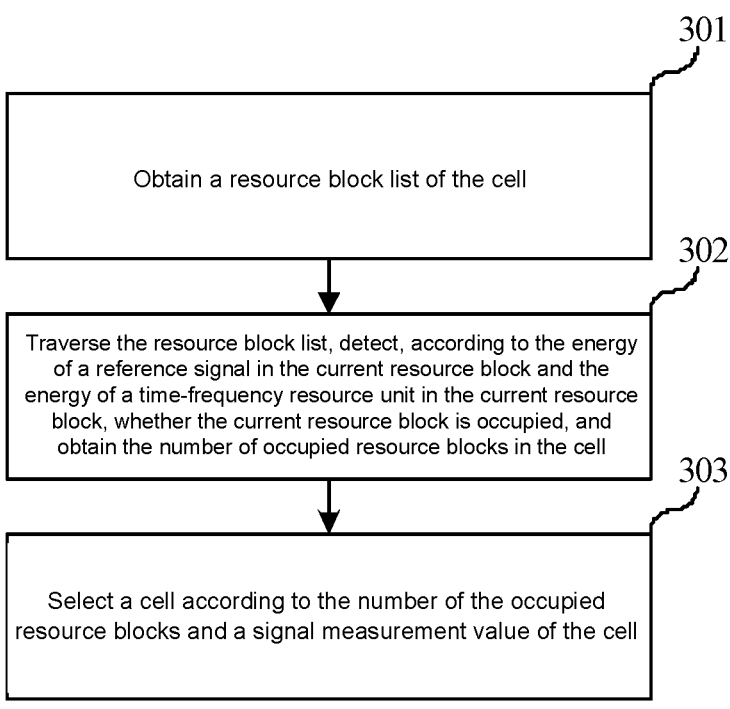
FIG. 3 is a flow diagram of a method for cell selection in accordance with an embodiment of the present disclosure.

Referring to FIG. 2, the bandwidth configuration of cell 2 is shown. There are three resource blocks in the cell 2, and the three resource blocks are not occupied and are in an idle state.

When the signal strength measured based on the reference signal in cell 1 is greater than the signal strength measured based on the reference signal in cell 2, the UE will select cell 1 which is already in a congested state. For example, in places such as canteen where many users are gathered, a cell with strong signal strength has too many UEs to access, and a cell with strong signal strength cannot provide an Internet access service.

That is to say, selecting a cell in the above mentioned manner may cause a UE to select a cell in which congestion has already occurred, and may also cause a certain cell to have too many UEs to access, thereby causing the cell to be congested, and further causing the cell not to provide any Internet access service for the UE, and causing the UE not to access the Internet.

In addition to the above described method, the UE in the existing art may also select a cell through a Packet Internet Groper (ping). The method requires a UE to access the cell first, and then selects a cell by pinging a certain server to determine the time delay of the cell. When the time delay is large, the UE exits the current cell and reselects a cell. The method relies on implementation of an application layer, and does not solve the problem of cell congestion from the bottom layer.

In order to avoid the electronic device selecting a congested cell and solving the problem of congestion in the cell from the bottom layer, the cell selected by the electronic device can provide an Internet access service for the electronic device. Embodiments of the present disclosure provide a cell selection method. The cell selection method of the present embodiment can be applied to an electronic device such as a UE, such as a mobile phone and a tablet. The cell selection method of the present embodiment may include: acquiring a resource block list of a cell; traversing the resource block list, and according to the energy of a reference signal in a current resource block and the energy of a time-frequency resource unit in the current resource block, detecting whether the current resource block is occupied, so as to obtain the number of occupied resource blocks in the cell; selecting a cell according to the number of occupied resource blocks and a signal measurement value of the cell.

According to the cell selection method provided in the present embodiment, a cell resource block list is acquired without only considering signal strength or signal quality, and is traversed, so as to obtain the number of occupied resource blocks in a cell; the number of occupied resource blocks of the cell reflects the cause of cell congestion from a physical layer perspective; and a cell is selected in combination with the number of occupied resource blocks and a signal measurement value. On the one hand, it is beneficial to avoid the situation that a UE cannot access the network due to the fact that the UE selects a cell where congestion occurs; on the other hand, this embodiment is beneficial to reduce the occurrence of cell congestion, so that the number of UEs served by each cell is more reasonable, and the service quality of the cell is improved. It can also avoid a UE accessing a cell where congestion has occurred, thereby relieving the congestion situation of the cell, i.e. the embodiments of the present disclosure optimize the selection capability of a cell.

In addition, the energy of a reference signal and the energy of a time-frequency resource unit in a current resource block reflect a service traffic condition of a cell. The embodiments of the present disclosure can determine a resource block occupation condition of a cell by combining the service traffic of the cell, so that the obtained resource block occupation condition is more accurate.

To make the objectives, technical solutions, and advantages of the embodiments of the present disclosure clearer, the following describes each embodiment of the present disclosure in detail with reference to the accompanying drawings. However, a person of ordinary skill in the art may understand that, in the embodiments of the present disclosure, many technical details are put forward to help a reader understand the present disclosure better. However, even without these technical details and various changes and corrections based on the following embodiments, the claimed technical solutions of the present disclosure can be implemented. Dividing of the following embodiments is for convenience of description, and shall not constitute any limitation to specific implementations of the present disclosure. The embodiments may be referred to in combination with each other without any contradiction.

The implementation details of the cell selection method in this embodiment are described in detail below. The following content is only for ease of understanding and is not a requirement for implementing this solution.

Step 301, acquire a resource block list of a cell.

In some embodiments, a UE acquires a reference signal configuration and a bandwidth configuration of a cell, and acquires a resource block list of the cell according to the reference signal configuration and the bandwidth configuration.

Exemplarily, the UE may obtain a bandwidth configuration and a reference signal configuration of the cell according to network parameters. The UE may obtain relevant information such as the number of Resource Block (RB) according to the bandwidth configuration; according to the reference signal configuration, obtaining information, such as a time-frequency Resource Element (RE) to which the reference signal of the cell is mapped and the energy of the reference signal; if there is a time-frequency resource unit mapped with a reference signal in a time-frequency resource unit of a certain resource block in a cell, adding the resource block identifier into a resource block list. For example, FIG. 1 is a bandwidth configuration of a cell 1. There are three resource blocks in the cell 1, and time-frequency resource units of the three resource blocks all have time-frequency resource units mapped with reference signals; therefore, resource block identifiers corresponding to the three resource blocks are all added to the resource blocks.

The network parameter may include the density of reference signals, and may be configured according to requirements in an actual application process, which is not limited in this embodiment A resource block RB consists of 12 consecutive subcarriers in the frequency domain and all OFDM (Orthogonal Frequency Division Multiplexing) symbols in one timeslot. A sub-carrier is the smallest resource granularity in frequency, an OFDM symbol is the smallest resource granularity in time domain, and one OFDM symbol and one sub-carrier constitute a time-frequency resource unit, i.e. a resource block (RB) includes a plurality of time-frequency resource units (REs).

Channel state information can be obtained by means of a reference signal, the reference signal exists discretely on a resource block (RB), and a time-frequency resource unit mapped on the RB can be obtained by means of calculation via a network parameter. For example, the CSI-RS may be used as a reference signal, but is not limited thereto. For a method and a process in which a base station generates a CSI-RS signal and maps the CSI-RS signal to a physical resource, reference may be made to 3GPP TS 38.211.

After the resource block list of the cell is obtained, Step 302 may be performed.

Step 302, a resource block list is traversed, and whether a current resource block is occupied is detected according to the energy of a reference signal in the current resource block and the energy of a time-frequency resource unit in the current resource block, so as to obtain the number of occupied resource blocks in a cell.

In some embodiments, the energy of part of reference signals in the current resource block may be selected, or the energy of part of time-division frequency resource units in the current resource block may be selected to determine whether the resource block is occupied, and this is not limited in this embodiment.

Figures 4, 5:
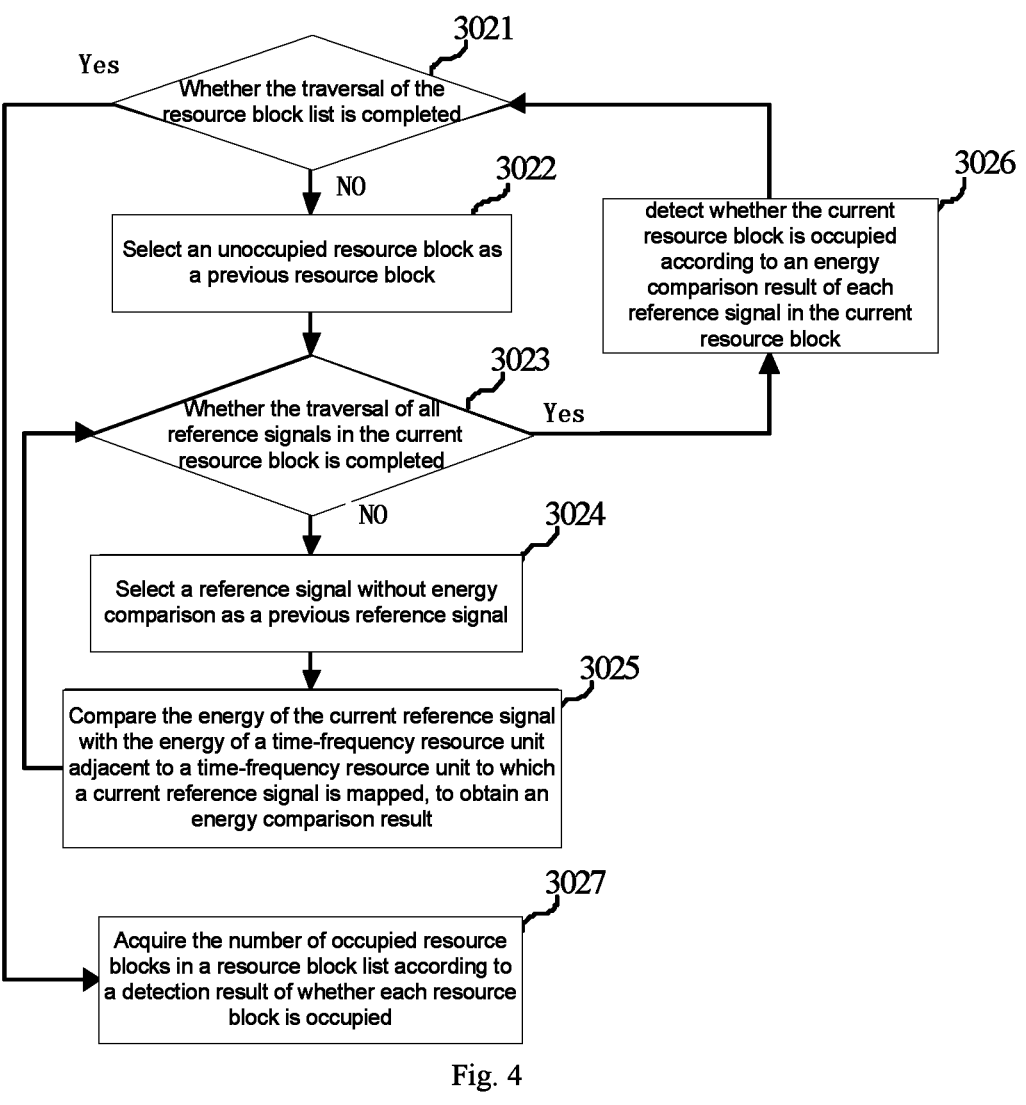
FIG. 4 is a flowchart of traversing resource block lists according to an embodiment of the present disclosure.
FIG. 5 is a schematic diagram of resource blocks of a cell according to an embodiment of the present disclosure.

In another embodiment, Step 302 may be as shown in FIG. 4.

Step 3021, judging whether the traversal of the resource block list is completed, and if the traversal is completed, executing Step 3027, otherwise, executing Step 3022.

That is to say, it is determined whether each resource block in the resource block list has been subjected to occupancy detection, and if a resource block that has not been subjected to occupancy detection exists in the resource block list, Step 3022 is performed.

Step 3022, a resource block on which occupancy detection is not performed is selected as the current resource block. After Step 3022 is performed, Step 1023 is performed.

Step 3023, it is determined whether the traversing of each reference signal in the current resource block is completed, and if the traversing is completed, Step 3026 is performed; otherwise, Step 3024 is performed.

That is to say, it is determined whether all reference signals in a current resource block are compared with reference signals adjacent to the current resource block, and if there are reference signals that are not compared, Step 3024 is performed.

Step 3024, a reference signal on which energy comparison is not performed is selected as the current reference signal. After the current reference signal is determined, Step 3025 is performed.

Step 3025, comparing the energy of a time-frequency resource unit adjacent to the time-frequency resource unit mapped with the current reference signal with the energy of the current reference signal to obtain an energy comparison result. After the energy comparison result is obtained, Step 3023 is performed.

The OFDM symbols and/or subcarriers of the adjacent time-frequency resource units are adjacent to the OFDM symbols and/or subcarriers of the time-frequency resource unit mapped with the current reference signal. In this embodiment, part of time-frequency resource units adjacent to the time-frequency resource unit to which the current reference signal is mapped may be obtained, and all time-frequency resource units adjacent to the time-frequency resource unit to which the current reference signal is mapped may also be obtained, which is not limited in this embodiment.

In an ideal state, when the difference between the measured energy of a time-frequency resource unit and the energy of a reference signal exceeds a set value, it can be determined that the resource block is occupied; however, in an actual transmission process, a signal is subject to different interference. In this embodiment, the energy of the time-frequency resource unit adjacent to the reference signal is compared with the energy of the reference signal, and the energy of the time-frequency resource unit adjacent to the reference signal is similar to interference, attenuation and other conditions of the reference signal. Therefore, in this embodiment, by selecting a comparison result between the energy of adjacent time-frequency resource units and the energy of a reference signal, it is determined whether the resource block is occupied, thereby being beneficial to reduce the adverse effect of signal interference on resource block occupancy determination, so that a detection result is more accurate.

In another embodiment, an average value of the energy of each time-frequency resource unit adjacent to the time-frequency resource unit to which the current reference signal is mapped is calculated; subtracting energy of the reference signal from the average value to obtain the energy comparison result. In this embodiment, by calculating the average value of adjacent time-frequency resource units, the influence of burst interference on the energy of the video resource units can be avoided, and the accuracy of the detection result can be further improved.

When the traverse of each reference signal in the current resource block is completed, that is, after the energy comparison result corresponding to each reference signal is obtained, Step 3026 is performed.

Step 3026, detect, according to an energy comparison result of each reference signal in the current resource block, whether the current resource block is occupied. After it is detected whether the current resource block is occupied, Step 3021 is performed to determine whether the resource block list is traversed completely, that is, to determine whether each resource block in the resource block list is occupied.

In some embodiments, counting the number of energy comparison results that are greater than a first preset threshold in energy comparison results of the reference signals; if the number is greater than or equal to the preset number, the current resource block is occupied. The first preset threshold may also be referred to as occupied threshold. In the present embodiment, each reference signal in a resource block is traversed to obtain an energy comparison result corresponding to each reference signal and perform counting; and whether the resource block is occupied is detected according to the statistical result, instead of performing detection according to some reference signals, which is beneficial to discharging an adverse effect of accidental signal interference on a judgment result, and further improving the accuracy of the detection result.

The following describes a process of detecting whether the resource block shown in FIG. 5 is occupied by taking the resource block shown in FIG. 5 as an example. There are three reference signals in FIG. 5, a first reference signal CSI-RS1, a second reference signal CSI-RS2 and a third reference signal CSI-RS3.

Traverse the three reference signals to obtain energy of all time-frequency resource units adjacent to the time-frequency resource unit mapped by the first reference signal. The time-frequency resource unit mapped with the reference signal is connected with a vertex of an adjacent time-frequency resource unit. As shown in FIG. 5, a time-frequency resource unit labeled as 1 is a time-frequency resource unit adjacent to a time-frequency resource unit mapped by a first reference signal; an average value of the energy of the time-frequency resource unit labeled as 1, i.e. a power average value P1, is calculated; the energy of a first reference signal CSI-RS1 is subtracted from P1, and a first energy comparison result is obtained; the time-frequency resource unit labeled as 2 is a time-frequency resource unit adjacent to the time-frequency resource unit mapped by the second reference signal, an average value of the energy of the time-frequency resource unit labeled as 2 is calculated, i.e. a power average value P2, and the energy of the second reference signal is subtracted from P2, so as to obtain a second energy comparison result; the time-frequency resource unit labeled as 3 is a time-frequency resource unit adjacent to the time-frequency resource unit mapped with the third reference signal; an average value of the energy of the time-frequency resource unit labeled as 3, i.e. a power average value P3, is calculated; and the energy of the third reference signal is subtracted from P3, so as to obtain a third energy comparison result. Respectively comparing a first energy comparison result, a second energy comparison result and a third energy comparison result with a first pre-set threshold value; counting the number of energy comparison results greater than the first pre-set threshold value in various energy comparison results; and if the number of energy comparison results greater than the first pre-set threshold value is greater than or equal to the pre-set number, the resource block being occupied.

Assuming that the first preset threshold is $-10$, the preset number is 2, and initially, the number of energy comparison results that are greater than the first preset threshold, count1, has an initial value of 0; the energy of each reference signal and the energy average value of adjacent time-frequency resource units have the following three scenarios, and the process of detecting whether a resource block is occupied in these three scenarios will be described below.

The first case is as follows:
the average value $P1=-78$ dBm of the energy of the time-frequency resource unit labeled as 1; measurement result of the energy of the CSI-RS1=$-75$ dBm; $-78-(-75)=-3>-10$, i.e. the first energy comparison result $-3$ is greater than the first pre-set threshold value $-10$, and in this case, count1=1;

The average value $P2=-76$ dBm of the energy of the time-frequency resource units labeled as 2; measurement result of energy of CSI-RS2=$-74$ dBm;
$-76-(-74)=-2>-10$, i.e. the second energy comparison result-2 is greater than the first pre-set threshold value $-10$, and in this case, count1=2;

The average value $P3=-76$ dBm of the energy of the time-frequency resource units labeled as 3; measurement result of energy of CSI-RS3=$-75$ dBm;
$-76-(-75)=-1>-10$, i.e. the third energy comparison result $-1$ is greater than the first pre-set threshold value $-10$, and in this case, count1=3;

Since the value of the number of the energy comparison results, which is greater than the first preset threshold, count1 is 3, which is greater than the preset number 2, the current resource block is occupied.

The second case is as follows:
The average value $P1=-78$ dBm of the energy of the time-frequency resource unit labeled 1; measurement result of the energy of the CSI-RS1=$-75$ dBm; $-78-(-75)=-3>-10$, i.e. the first energy comparison result $-3$ is greater than the first pre-set threshold value $-10$, and in this case, count1=1;

The average value $P2=-76$ dBm of the energy of the time-frequency resource units labeled as 2; measurement result of energy of CSI-RS2=$-74$ dBm;
$-76-(-74)=-2>-10$, i.e. the second energy comparison result-2 is greater than the first pre-set threshold value $-10$, and in this case, count1=2;

The average value $P3=-76$ dBm of the energy of the time-frequency resource units labeled as 3; measurement result of energy of CSI-RS3=$-65$ dBm;
$-76-(-65)=-11<10$, i.e., the third energy comparison result of $-11$ is less than the first preset threshold value of $-10$, and at this time, count1=2;

Since the number of the energy comparison results that are greater than the first preset threshold, count1 is 2, which is the same as the preset number 2, the current resource block is occupied.

The third case is as follows:
The average value $P1=-78$ dBm of the energy of the time-frequency resource unit labeled 1; measurement result of the energy of the CSI-RS1=$-75$ dBm; $-78-(-75)=-3>-10$, i.e. the first energy comparison result $-3$ is greater than the first pre-set threshold value $-10$, and in this case, count1=1;

The average value $P2=-76$ dBm of the energy of the time-frequency resource units labeled as 2; measurement result of the energy of the CSI-RS2=$-64$ dBm;

$-76-(-64)=-12$ less than or equal to $-10$, that is, the second energy comparison result of $-12$ is less than the first preset threshold of $-10$, and at this time, count1=1;

The average value $P3=-76$ dBm of the energy of the time-frequency resource units labeled as 3; measurement result of energy of CSI-RS3=$-65$ dBm;

$-76-(-65)=-11<10$, i.e., the third energy comparison result of $-11$ is less than the first preset threshold value of $-10$, and at this time, count1=1;

Since the number of the energy comparison results, count1, greater than the first preset threshold is 1, which is smaller than the preset number 2, the current resource block is not occupied.

After the occupation detection is performed on each resource block in the resource block list to obtain the detection result about whether each resource block is occupied, Step 3027 is performed.

Step 3027, acquire the number of occupied resource blocks in the resource block list according to the detection result about whether each resource block is occupied.

Making statistics on the described occupied detection result, and acquiring the number of occupied resource blocks.

The above is a step of acquiring the number of occupied resource blocks in the resource block list, and after this step, Step 303 may be performed.

Step 303, selecting a cell according to the number of occupied resource blocks and a signal measurement value of the cell.

In some embodiments, the signal measurements may be Energy Per Resource Element (EPRE).

In some embodiments, acquiring a cell resource block utilization rate according to the number of occupied resource blocks; according to the cell resource block utilization rate, correcting the signal measurement value to obtain a corrected signal measurement value; wherein the corrected signal measurement value is negatively correlated with the cell resource block utilization rate; selecting a cell according to the corrected signal measurement values.

In some embodiments, if the cell resource block utilization rate is greater than a second preset threshold value, the signal measurement value is decreased by a preset correction value; if the cell resource block utilization rate is less than a third pre-set threshold value, adding a pre-set correction value to the signal measurement value.

Exemplarily, the second preset threshold is 70%, and the third preset threshold is 30%. When the cell resource block utilization rate is greater than 70%, it is considered that the cell is a congested cell, and the signal measurement value of the cell is reduced by 5 dB; if less than 30% of the RBs are determined to be congested, then the cell is considered to be an idle cell, and the signal measurement value of the cell is increased by 5 dB. Taking a resource block list containing ten resource blocks as an example, in conjunction with the following Table 1, the correction of the cell measurement value in different scenarios is briefly described.

TABLE 1

| Scenario number | Number of occupied resource blocks | Cell resource block occupancy rate | Correction situation |
|---|---|---|---|
| 1 | 2 | 0.2 | Idle, signal measurement value increased by 5 dB |
| 2 | 8 | 0.8 | Congestion, reduction of signal measurement by 5 dB |
| 3 | 5 | 0.5 | Normal, do not change signal measurement value |

In some embodiments, the number of decrease in signal measurements may vary with the calculated change in resource block utilization of the cell, i.e., f(resource block utilization rate)=number of change in signal measurements, wherein the lower the resource block utilization, the higher the increased signal measurements, the higher the resource block utilization, and the higher the decreased signal measurements.

In other embodiments, the total number of resource blocks of the cell is obtained; obtaining the number of idle resource blocks of the cell according to the total number of the resource blocks and the number of the occupied resource blocks; according to the number of idle resource blocks, correcting the signal measurement value to obtain a corrected signal measurement value; wherein the corrected signal measurement value is positively correlated with the number of the idle resource blocks; selecting a cell according to the corrected signal measurement values.

Exemplarily, if the total number of the resource blocks of the cell is 10 and the number of the occupied resource blocks is 2, the number of idle resource blocks obtained is 8, and the number of the idle resource blocks is greater than the preset first number of idle resource blocks, and therefore, the signal measurement value is increased by 5 dB; if the number of occupied resource blocks is 9 and the number of idle resource blocks is 1, and the number of idle resource blocks is less than the preset number of second idle resource blocks, the signal measurement value is reduced by 5 dB.

After the signal measurement values are corrected, cells can be selected according to the magnitudes of the signal measurement values. In this embodiment, the problem that the cell service quality deteriorates rapidly due to the fact that the strong signal cell is accessed by too many UEs can be alleviated to a great extent. In the present embodiment, a cell is selected in conjunction with an occupation condition of a resource block and a signal measurement value. With regard to a UE, the access of the UE to a cell in which congestion occurs can be avoided, so that the UE can access the Internet normally, thereby improving the user experience of a UE; with regard to a cell, when congestion has already occurred in the cell, the congestion condition of the cell can be effectively alleviated; and when congestion does not occur in the cell, the occurrence of the congestion of the cell can be greatly reduced.

It is worth mentioning that the described embodiments of the present disclosure all take the signal strength of the signal measurement value as an example. In an actual application, a signal measurement value, such as a signal-to-noise ratio, reflecting signal quality may also be selected, and a cell is selected in conjunction with the signal quality of a cell and a resource block occupation condition of the cell; and a signal measurement value may also be made to reflect a comprehensive value of the signal strength and the signal quality, and a cell is selected in conjunction with the measurement value and the resource block occupation condition of the cell.

The step division of the above various methods is only for the purpose of clear description, and during implementation, the methods may be combined into one step or some steps may be divided into a plurality of steps, and all the steps are within the scope of protection of the present patent as long as they include the same logic relationship; it is within the scope of protection of the patent to add insignificant corrections to or introduce insignificant designs into the algorithms or flows, but not to change the core design of the algorithms and flows.

Figure 6:
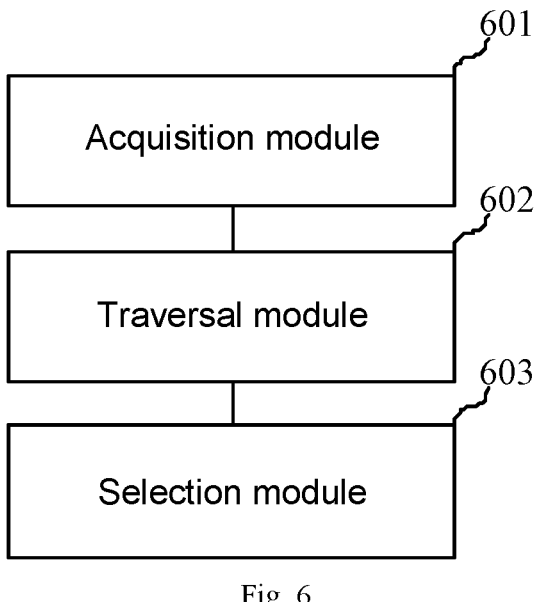
FIG. 6 is a schematic diagram of a cell selection apparatus according to an embodiment of the present disclosure.

Embodiments of the present disclosure also relate to a cell selection device. As shown in FIG. 6, the device may include: an acquisition module 601, configured to acquire a resource block list of a cell; a traversing module 602, configured to traverse the resource block list, and detect, according to the energy of a reference signal in a current resource block and the energy of a time-frequency resource unit in the current resource block, whether the current resource block is occupied, so as to obtain the number of occupied resource blocks in the cell; a selection module 603, configured to select a cell according to the number of occupied resource blocks and a signal measurement value of the cell.

In some embodiments, the traversing module 602 is further configured to traverse a reference signal in the current resource block, and compare an energy of a time-frequency resource unit adjacent to the time-frequency resource unit mapped with the current reference signal with an energy of the current reference signal to obtain an energy comparison result of the current reference signal; according to an energy comparison result of each reference signal in the current resource block, detecting whether the current resource block is occupied.

In some embodiments, the traversing module 602 is further configured to calculate an average value of the energy of each time-frequency resource unit adjacent to the time-frequency resource unit to which the current reference signal is mapped; subtracting energy of the reference signal from the average value to obtain the energy comparison result.

In some embodiments, the traversing module 602 is further configured to count the number of energy comparison results that are greater than a first preset threshold in the energy comparison results of the reference signals; if the number is greater than or equal to the preset number, the current resource block is occupied.

In an embodiment, the selection module 603 is further configured to acquire a cell resource block utilization rate according to the number of occupied resource blocks; according to the cell resource block utilization rate, correcting the signal measurement value to obtain a corrected signal measurement value; wherein the corrected signal measurement value is negatively correlated with the cell resource block utilization rate; selecting a cell according to the corrected signal measurement values.

In some embodiments, the selection module 603 is further configured to reduce the signal measurement value by a preset correction value when the cell resource block utilization rate is greater than a second preset threshold value; if the cell resource block utilization rate is less than a third pre-set threshold value, adding a pre-set correction value to the signal measurement value.

In some embodiments, a total number of resource blocks for a cell is obtained; obtaining the number of idle resource blocks of the cell according to the total number of the resource blocks and the number of the occupied resource blocks; according to the number of idle resource blocks, correcting the signal measurement value to obtain a corrected signal measurement value; wherein the corrected signal measurement value is positively correlated with the number of the idle resource blocks; selecting a cell according to the corrected signal measurement values.

It can be easily noted that this embodiment is a system embodiment corresponding to the embodiment of the above cell selection method, and this embodiment can be implemented in cooperation with the embodiment of the above cell selection method. Related technical details mentioned in the embodiment of the cell selection method are still valid in the present embodiment, and are not repeated herein to reduce repetition. Correspondingly, related technical details mentioned in this embodiment may also be applied in the first embodiment.

It should be noted that all modules involved in this embodiment are logic modules. In a practical application, one logic unit may be one physical unit or a part of one physical unit, and may also be implemented by using a combination of a plurality of physical units. In addition, in order to highlight the inventive part of the present disclosure, the present embodiment does not introduce units less closely related to solving the technical problem proposed by the present disclosure, but this does not indicate that other units do not exist in the present embodiment.

Figure 7:
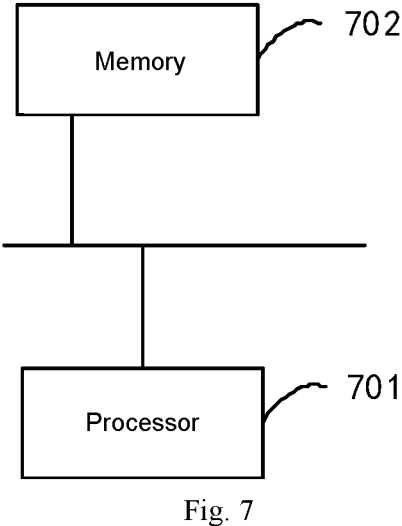
FIG. 7 is a schematic structural diagram of an electronic device according to an embodiment of the present disclosure.

Embodiments of the present disclosure also relate to an electronic device. As shown in FIG. 7, the electronic device may include at least one processor 701; and a memory 702 communicatively connected to the at least one processor; the memory 702 stores an instruction that can be executed by the at least one processor 701, where the instruction is executed by the at least one processor 701, so that the at least one processor 701 can execute the foregoing cell selection method.

The memory and the processor are connected in a bus manner, the bus may include any number of interconnected buses and bridges, and the bus connects various circuits of the one or more processors and the memory together. The bus may also connect a variety of other circuits, such as peripheral devices, voltage regulators, and power management circuitry, which are well known in the art and therefore are not described further herein. The bus interface provides an interface between the bus and the transceiver. A transceiver may be one element or multiple elements, such as multiple receivers and transmitters, that provide a means for communicating with various other devices over a transmission medium. Data processed by a processor is transmitted on a wireless medium through an antenna, and further, the antenna receives the data and transmits the data to the processor.

The processor is responsible for managing a bus and general processing, and can further provide various functions, including timing, peripheral interfaces, voltage regulation, power management, and other control functions. And the memory may be used to store data used by the processor in performing operations.

Embodiments of the present disclosure also relate to a computer readable storage medium, which stores a computer program. The computer program implements the foregoing method embodiments when being executed by a processor.

That is, a person skilled in the art may understand that all or a part of the steps of the methods in the foregoing embodiments may be implemented by a program instructing relevant hardware. The program is stored in a storage medium and includes several instructions for instructing a device (which may be a single chip, a chip, or the like) or a processor to execute all or a part of the steps of the methods in the embodiments of the present disclosure. The foregoing storage medium includes: any medium that can store program codes, such as a USB flash disk, a removable hard disk, a Read-Only Memory (ROM), a Random Access Memory (RAM), a magnetic disk, or an optical disk.

Persons of ordinary skill in the art should understand that the foregoing embodiments are specific embodiments for implementing the present disclosure, and in practical applications, various changes may be made to the embodiments in forms and details without departing from the spirit and scope of the present disclosure.

What is claimed is:

1. A cell selection method, comprising:
acquiring a resource block list of a cell, wherein the resource block list comprises at least one resource block identifier;
traversing the resource block list, and detecting, according to energy of a reference signal in a current resource block and energy of a time-frequency resource unit in the current resource block, whether the current resource block is occupied, so as to obtain number of occupied resource blocks in the cell; and
selecting a cell according to the number of occupied resource blocks and a signal measurement value of the cell;
wherein the selecting a cell according to the number of occupied resource blocks and a signal measurement value of the cell comprises: acquiring a cell resource block utilization rate according to the number of occupied resource blocks; correcting, according to the cell resource block utilization rate, the signal measurement value to obtain a corrected signal measurement value, wherein the corrected signal measurement value is negatively correlated with the cell resource block utilization rate; and selecting a cell according to the corrected signal measurement value; or
wherein the selecting a cell according to the number of occupied resource blocks and a signal measurement value of the cell comprises: acquiring total number of resource blocks of the cell; obtaining number of idle resource blocks of the cell according to the total number of the resource blocks and the number of the occupied resource blocks; correcting, according to the number of idle resource blocks, the signal measurement value to obtain a corrected signal measurement value; wherein the corrected signal measurement value is positively correlated with the number of the idle resource blocks; and selecting a cell according to the corrected signal measurement value.

2. The cell selection method according to claim 1, wherein the step of detecting, according to the energy of a reference signal in a current resource block and the energy of a time-frequency resource unit in the current resource block, whether the current resource block is occupied comprises:
traversing reference signals in the current resource block, and comparing the energy of the current reference signal with the energy of a time-frequency resource unit adjacent to the time-frequency resource unit to which the current reference signal is mapped, so as to obtain an energy comparison result of the current reference signal; and
detecting whether the current resource block is occupied according to an energy comparison results of each reference signal in the current resource block.

3. The cell selection method according to claim 2, wherein the comparing the energy of the current reference signal with the energy of the time-frequency resource unit adjacent to the time-frequency resource unit to which the current reference signal is mapped comprises:

calculating an average value of energy of each time-frequency resource unit adjacent to the time-frequency resource unit to which the current reference signal is mapped; and subtracting the energy of the reference signal from the average value to obtain the energy comparison result.

4. The cell selection method according to claim 3, wherein the detecting, according to an energy comparison result of each reference signal in the current resource block, whether the current resource block is occupied comprises:

counting number of energy comparison results which are greater than a first pre-set threshold value in the energy comparison results of each of reference signals; and when the number of energy comparison results which are greater than a first pre-set threshold value is greater than or equal to the preset number, then the current resource block is occupied.

5. The cell selection method according to claim 2, wherein the detecting, according to an energy comparison result of each reference signal in the current resource block, whether the current resource block is occupied comprises:

counting number of energy comparison results which are greater than a first pre-set threshold value in the energy comparison results of each of reference signals; and when the number of energy comparison results which are greater than a first pre-set threshold value is greater than or equal to the preset number, then the current resource block is occupied.

6. The cell selection method according to claim 1, wherein the correcting the signal measurement value according to a cell resource block utilization rate comprises:

when the cell resource block utilization rate is greater than a second pre-set threshold value, reducing the signal measurement value by a pre-set correction value; and when the cell resource block utilization rate is less than a third pre-set threshold value, adding a pre-set correction value to the signal measurement value.

7. An electronic device, comprising:

at least one processor; and, a memory communicatively coupled to the at least one processor; wherein, the memory stores an instruction executable by the at least one processor, the instruction is configured to, when executed by the at least one processor, cause the at least one processor to:

acquire a resource block list of a cell, wherein the resource block list comprises at least one resource block identifier;

traverse the resource block list, and detecting, according to energy of a reference signal in a current resource block and energy of a time-frequency resource unit in the current resource block, whether the current resource block is occupied, so as to obtain number of occupied resource blocks in the cell; and select a cell according to the number of occupied resource blocks and a signal measurement value of the cell;

wherein the select a cell according to the number of occupied resource blocks and a signal measurement value of the cell comprises: acquire a cell resource block utilization rate according to the number of occupied resource blocks; correct, according to the cell resource block utilization rate, the signal measurement value to obtain a corrected signal measurement value, wherein the corrected signal measurement value is negatively correlated with the cell resource block utilization rate; and select a cell according to the corrected signal measurement value; or wherein the select a cell according to the number of occupied resource blocks and a signal measurement value of the cell comprises: acquire total number of resource blocks of the cell; obtain number of idle resource blocks of the cell according to the total number of the resource blocks and the number of the occupied resource blocks; correct, according to the number of idle resource blocks, the signal measurement value to obtain a corrected signal measurement value; wherein the corrected signal measurement value is positively correlated with the number of the idle resource blocks; and select a cell according to the corrected signal measurement value.

8. The electronic device according to claim 7, the instruction is further configured to, when executed by the at least one processor, cause the at least one processor to:

traverse reference signals in the current resource block, and compare the energy of the current reference signal with the energy of a time-frequency resource unit adjacent to the time-frequency resource unit to which the current reference signal is mapped, so as to obtain an energy comparison result of the current reference signal; and detect whether the current resource block is occupied according to an energy comparison results of each reference signal in the current resource block.

9. The electronic device according to claim 8, the instruction is further configured to, when executed by the at least one processor, cause the at least one processor to:

calculate an average value of energy of each time-frequency resource unit adjacent to the time-frequency resource unit to which the current reference signal is mapped; and subtract the energy of the reference signal from the average value to obtain the energy comparison result.

10. The electronic device according to claim 8, the instruction is further configured to, when executed by the at least one processor, cause the at least one processor to:

count number of energy comparison results which are greater than a first pre-set threshold value in the energy comparison results of each of reference signals; and when the number of energy comparison results which are greater than a first pre-set threshold value is greater than or equal to the preset number, then the current resource block is occupied.

11. The electronic device according to claim 7, instruction is further configured to, when executed by the at least one processor, cause the at least one processor to:

when the cell resource block utilization rate is greater than a second pre-set threshold value, reduce the signal measurement value by a pre-set correction value; and when the cell resource block utilization rate is less than a third pre-set threshold value, add a pre-set correction value to the signal measurement value.

12. A non-transitory computer readable storage medium, storing a computer program, when executed by a processor, the computer program is configured to:

acquire a resource block list of a cell, wherein the resource block list comprises at least one resource block identifier;

traverse the resource block list, and detecting, according to energy of a reference signal in a current resource block and energy of a time-frequency resource unit in the current resource block, whether the current resource block is occupied, so as to obtain number of occupied resource blocks in the cell; and select a cell according to the number of occupied resource blocks and a signal measurement value of the cell;

wherein the select a cell according to the number of occupied resource blocks and a signal measurement value of the cell comprises: acquire a cell resource block utilization rate according to the number of occupied resource blocks; correct, according to the cell resource block utilization rate, the signal measurement value to obtain a corrected signal measurement value, wherein the corrected signal measurement value is negatively correlated with the cell resource block utilization rate; and select a cell according to the corrected signal measurement value; or wherein the select a cell according to the number of occupied resource blocks and a signal measurement value of the cell comprises: acquire total number of resource blocks of the cell; obtain number of idle resource blocks of the cell according to the total number of the resource blocks and the number of the occupied resource blocks; correct, according to the number of idle resource blocks, the signal measurement value to obtain a corrected signal measurement value; wherein the corrected signal measurement value is positively correlated with the number of the idle resource blocks; and select a cell according to the corrected signal measurement value.

\* \* \* \* \*